United States Patent
Gould

(10) Patent No.: US 12,293,499 B2
(45) Date of Patent: May 6, 2025

(54) VEHICLE IMAGING STATION

(71) Applicant: Degould Limited, Exeter (GB)

(72) Inventor: Daniel Gould, Exeter (GB)

(73) Assignee: DEGOULD LIMITED, Exeter (GB)

( * ) Notice: Subject to any disclaimer, the term of this patent is extended or adjusted under 35 U.S.C. 154(b) by 0 days.

(21) Appl. No.: 17/763,491

(22) PCT Filed: Sep. 22, 2020

(86) PCT No.: PCT/GB2020/052287
§ 371 (c)(1),
(2) Date: Mar. 24, 2022

(87) PCT Pub. No.: WO2021/064351
PCT Pub. Date: Apr. 8, 2021

(65) Prior Publication Data
US 2022/0375059 A1 Nov. 24, 2022

(30) Foreign Application Priority Data
Oct. 4, 2019 (GB) .................................. 1914317

(51) Int. Cl.
*G06T 7/00* (2017.01)
*G06T 7/586* (2017.01)
*G06T 7/90* (2017.01)

(52) U.S. Cl.
CPC ............ *G06T 7/0002* (2013.01); *G06T 7/586* (2017.01); *G06T 7/90* (2017.01)

(58) Field of Classification Search
CPC .................. G06T 7/0004; G06T 7/0002; G06T 2207/30252; G06T 2207/30156; G06T 2207/30108; G06T 7/586
See application file for complete search history.

(56) References Cited

U.S. PATENT DOCUMENTS

| 2017/0195525 A1 | 7/2017 | Wierich |
| 2018/0012350 A1 | 1/2018 | Gangitano et al. |

FOREIGN PATENT DOCUMENTS

| CZ | 201861 A3 | 6/2019 |
| DE | 10-2007-063529 A | 7/2009 |

(Continued)

OTHER PUBLICATIONS (PCT) International Search Report and Written Opinion issued by the European Patent Office acting as International Searching Authority for International Patent Application No. PCT/GB2020/052287 dated Dec. 15, 2020 (15 total pages).

(Continued)

*Primary Examiner* — Raphael Schwartz
(74) *Attorney, Agent, or Firm* — Thompson Hine LLP

(57) ABSTRACT

A vehicle imaging station for capturing images of scratches on a vehicle, the vehicle imaging station including a tunnel having an entrance and an exit with one or more walls defining an enclosure between the entrance and exit to define a tunnel volume containing a vehicle pathway having a central axis. The station further includes a relatively bright reflection surface; a relatively dark reflection surface; and a camera array including one or more cameras arranged with: a first field of view including a first portion of the tunnel volume in which a relatively bright image defined by the relatively bright reflection surface will be reflected to be visible to the camera array by a vehicle moving along the vehicle pathway; a second field of view including a second portion of the tunnel volume in which a relatively dark image defined by the relatively dark reflection surface will be reflected to be visible to the camera array by a vehicle moving along the vehicle pathway.

16 Claims, 4 Drawing Sheets

(56) References Cited

FOREIGN PATENT DOCUMENTS

| DE | 10-2016-010833 | A1 | | 3/2017 | |
|---|---|---|---|---|---|
| DE | 10-2017-210558 | B3 | | 11/2018 | |
| EP | 3388781 | A1 | | 10/2018 | |
| EP | 3792619 | A1 | * | 3/2021 | ......... G01N 21/8806 |
| GB | 2308656 | A | | 7/1997 | |
| JP | 10-318938 | A | | 12/1998 | |
| JP | 2000-172845 | A | | 6/2000 | |
| WO | 2014/048408 | A1 | | 4/2014 | |
| WO | 2018/130421 | A1 | | 7/2018 | |
| WO | 2019/122701 | A1 | | 6/2019 | |

OTHER PUBLICATIONS (UKIPO) Combined Search and Examination Report issued by the United Kingdom Intellectual Property Office for application GB1914317.1 dated Dec. 12, 2019 (8 total pages).
(UKIPO) Examination Report issued by the United Kingdom Intellectual Property Office for application GB1914317.1 dated Jun. 18, 2020 (3 total pages).
(UKIPO) Examination Report issued by the United Kingdom Intellectual Property Office for application GB1914317.1 dated Sep. 14, 2020 (3 total pages).
(UKIPO) Examination Report issued by the United Kingdom Intellectual Property Office for application GB1914217.1 dated Jan. 12, 2021 (2 total pages).
(UKIPO) Examination Report issued by the United Kingdom Intellectual Property Office for application GB1914317.1 dated May 12, 2021 (4 total pages).
(UKIPO) Examination Report issued by the United Kingdom Intellectual Property Office for application GB1914317.1 dated Oct. 18, 2021 (4 total pages).
(UKIPO) Examination Report issued by the United Kingdom Intellectual Property Office for application GB1914317.1 dated Dec. 22, 2021 (4 total pages).
(UKIPO) Examination Report issued by the United Kingdom Intellectual Property Office for application GB1914317.1 dated Jan. 19, 2022 (4 total pages).
European Patent Office, Communication pursuant to Article 94(3) EPC (Examination Report), European Patent Application No. 20780320.6, 3 pages, Jul. 10, 2023.
Japanese Patent Office; Notice of Rejection pertaining to Japanese Patent Application No. JP2022-520143; 3 pgs.
European Patent Office, Examination Report (Communication pursuant to Article 94(3) EPC), European Patent Application No. 20780320.6, 4 pages, Dec. 3, 2024.
China National Intellectual Property Administration, First Office Action Notification (with English translation), Chinese Patent Application No. 202080070394.1, 9 pp. Jan. 27, 2025.

* cited by examiner

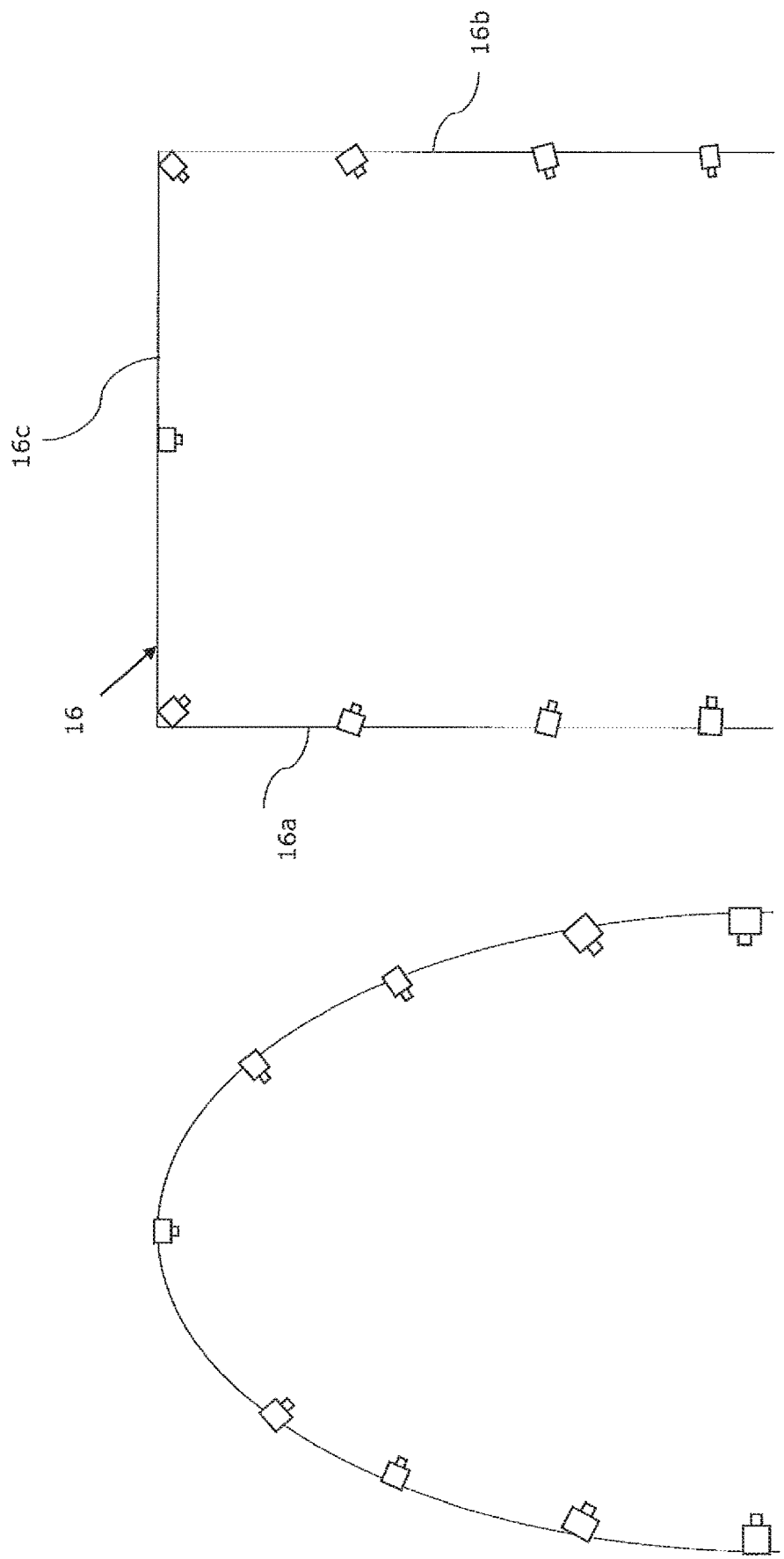

VEHICLE IMAGING STATION

This application is a national stage filing of International Application No. PCT/GB2020/052287 filed on Sep. 22, 2020 (corresponding to Publication No. WO 2021/064351), which in turn claims priority to GB 1914317.1 filed on Oct. 4, 2019. The entire contents of both of these applications are hereby incorporated by reference.

FIELD

This application relates to a vehicle imaging station, and more particularly to a vehicle imaging station for identifying scratches and/or dents on a vehicle.

BACKGROUND

Over time, a vehicle may suffer external damage including scratches.

Vehicle imaging stations are known which use digital cameras to capture images of a vehicle to identify scratches on the vehicle.

The present inventor has devised an improved vehicle imaging station that can detect scratches on a vehicle more accurately in comparison to known vehicle imaging stations.

SUMMARY

In accordance with a first aspect of the present invention, there is provided a vehicle imaging station for capturing images of scratches on a vehicle, the vehicle imaging station comprising:
  a tunnel having an entrance and an exit with one or more walls defining an enclosure between the entrance and exit to define a tunnel volume containing a vehicle pathway having a central axis;
  a relatively bright reflection surface;
  a relatively dark reflection surface; and
  a camera array comprising one or more cameras arranged with:
    a first field of view comprising, containing and/or encompassing a first portion of the tunnel volume in which a relatively bright image defined by the relatively bright reflection surface will be reflected to be visible to the camera array by a vehicle moving along the vehicle pathway;
    a second field of view comprising, containing and/or encompassing a second portion of the tunnel volume in which a relatively dark image defined by the relatively dark reflection surface will be reflected to be visible to the camera array by a vehicle moving along the vehicle pathway.

Thus, the vehicle imaging station of the first aspect has a camera array with at least two fields of view where one sees a bright reflection when the vehicle passes through the tunnel and one sees a dark reflection when the vehicle passes through the tunnel. The present inventor has found that a vehicle imaging station according to the first aspect of the invention enables the detection of scratches on a vehicle with a high degree of accuracy. Depending on the color of the vehicle and the color and/or depth of a scratch, it is likely to be more visible in only one of the light and dark fields of view. Many vehicle and scratch combinations will only be visible in one of the light and dark fields of view. As such, by providing both relatively light and dark fields of view in a single vehicle imaging station, the vehicle imaging station according to the first aspect can detect scratches on a vehicle more accurately in comparison to known vehicle imaging stations.

A second relatively bright reflection surface can be provided, the second relatively bright reflection surface being relatively bright in comparison to the relatively dark reflection surface. In such embodiments the camera array comprises a third field of view comprising, containing and/or encompassing a third portion of the tunnel volume in which a second relatively bright image defined by the second relatively bright reflection surface will be reflected to be visible to the camera array by a vehicle moving along the vehicle pathway.

The second relatively bright reflection surface can be relatively bright in comparison to first relatively bright reflection surface.

One or more, or all of the relatively dark reflection surface, the relatively bright reflection surface and/or the second relatively bright reflection surface can each comprise a non-reflective, non-illuminating surface. The present inventor has found that the presence of a non-reflective, non-illuminating surface within the tunnel can result in scratches being clearly visible. The non-reflective, non-illuminating surface can be any surface that scatters more light than it reflects and is not a light source.

Each non-reflective, non-illuminating surface can be a plain surface for example a substantially non-patterned surface. This can provide a blank reflection image to the camera array in which scratches on the vehicle are easily observable.

Each non-reflective, non-illuminating surface can be planar or flat.

One or more, or all of the relatively dark reflection surface, the relatively bright reflection surface and/or the second relatively bright reflection surface can each comprise an illuminated surface. For example, in some embodiments each surface can be illuminated, in some cases with three distinct brightness levels. In other embodiments just one or both of the relatively bright reflection surfaces can comprise illuminated surfaces, in some cases with distinct brightness levels.

Where a second relatively bright reflection surface is provided, the second relatively bright reflection surface can comprise a structured light source. Thus, the third field of view of the camera array, which sees the structured light source as the vehicle passes through the tunnel, can enable dents in the vehicle to be accurately recorded in the second relatively bright image.

A light source can be provided, which can be distinct from the illuminated surface, and arranged to direct light within the tunnel.

The camera array can comprise a single camera, the field of view of the single camera comprising the first and second, and in some embodiments the third, fields of view.

Alternatively, each field of view can be defined by a distinct camera of the camera array. In such embodiments, the cameras of the camera array can be mounted between the reflection surfaces.

The first and second, and optionally third, fields of view can define a first vision region pair, arranged together to enable scratch, and optionally dent, detection of a region of a vehicle, such as the top, a side, a portion thereof for example.

The imaging station can comprise one or more further vision region pairs, at least one of which can be mounted on the opposite side of the central axis of the vehicle pathway in comparison to the first pair and/or one of which can be mounted on a roof surface of the tunnel facing the vehicle pathway in order to capture images of the roof. A series of more than five camera pairs can be mounted in a series around the tunnel.

The side walls and roof can be generally planar or flat, with the roof extending orthogonally to the side walls to create a rectangular cross section tunnel. Alternatively, the tunnel can have an arc shaped or otherwise curved cross section.

The ends of the side wall(s) can define the opening and exit i.e. the opening and exit can have roughly the same cross sectional area as other portions of the tunnel.

The ends of the side wall(s) can extend inwardly towards one another to define angled end wall portions which define the entrance and exit. This arrangement can enable the middle portion of the tunnel to have a relatively large cross sectional area for containing equipment, while the area of the entrance and exit is each relatively small to control the amount of light that can enter the tunnel.

Where angled end wall portions are provided, the structured light source can be mounted on or adjacent the internal surface(s) of the angled end wall portions. This can reduce the likelihood of a driver of the vehicle seeing the structured light image as the vehicle enters the tunnel.

The entrance can be distinct from the exit, resulting in a linear vehicle pathway between the entrance and exit. The entrance and exit can be aligned. The linear pathway can be a straight line for ease of passage.

The imaging station can comprise one or more, further cameras arranged to capture images of the front and/or rear of the vehicle, the underbody and/or the wheels or tires. This can enable the number plate to be captured by the system and/or the condition of wheels, tires and the underbody to be recorded.

The imaging station can comprise a data processor or controller such as a general purpose computer, application specific integrated circuit or the like, arranged to receive inputs from the cameras and store them in computer memory and/or transmit them to a remote device.

The controller can execute a program arranged to trigger the cameras. The controller can be arranged to trigger cameras in response to criteria such as input from one or more sensors and/or temporal conditions having been met.

The imaging station can comprise one or more sensors coupled to the controller. The imaging station can for example comprise: a sound transducer such as a microphone arranged to detect engine noise; a proximity sensor arranged to detect a vehicle approaching the opening; and/or a vehicle speed sensor that the controller can use to synchronize cameras for stitching images together to form a continuous image of some or all of the vehicle or for adjusting camera settings such as shutter speed. In embodiments where the camera array consists of a single camera, the controller can be configured to stitch the various field of view regions of the single camera together to form a continuous image of some or all of the vehicle.

The controller can execute a program to perform color matching to adjust camera settings for vehicle color.

In accordance with a second aspect of the present invention, there is provided a vehicle imaging station for capturing images of scratches and dents on a vehicle, the vehicle imaging station comprising:

a tunnel having an entrance and an exit with one or more walls defining an enclosure between the entrance and exit to define a tunnel volume containing a vehicle pathway having a central axis;

a structured light source arranged to direct structured light at the vehicle pathway for illuminating a vehicle on the pathway with a structured light image;

a single camera arranged with:
 a first field of view region comprising, containing and/or encompassing a structured light portion of the tunnel volume in which the structured light image will be reflected to be visible to the single camera by a vehicle moving along the vehicle pathway;
 a second field of view region comprising, containing and/or encompassing a non-structured light portion of the tunnel volume in which the structured light image will not be reflected to be visible to the single camera when a vehicle moves along the vehicle pathway; and a non-reflective, non-illuminating surface within the tunnel on a same side of the central axis of the vehicle pathway as the camera.

The present inventor has found that a vehicle imaging station according to the second aspect of the invention enables the detection of dents and scratches on a vehicle, in a single pass with a high degree of accuracy. The tunnel controls the amount of light noise appearing in images captured by the cameras. The structured light image generated by the structured light source enables the first field of view region of the camera to serve as a dent detection camera, where an observed deviation from the expected structure pattern due to a known profile of the vehicle is indicative of a dent. The structured pattern can for example be a series of parallel strips of light. The second field of view region of the camera serves as a scratch detection camera and is orientated to observe a non-structured light portion of the tunnel volume, in which the single camera cannot see a direct reflection of the structured light source, which could otherwise adversely affect the ability to observe scratches on the vehicle. The present inventor has found that the presence of the non-reflective, non-illuminating surface within the tunnel results in scratches being clearly visible, even when the only light source within the tunnel is the structured light source. The non-reflective, non-illuminating surface can be any surface that scatters more light than it reflects and is not a light source.

Features of the first aspect, including optional features, can be applied to the imaging station of the second aspect in an analogous manner.

BRIEF DESCRIPTION OF THE DRAWINGS

By way of example only, certain embodiments of the invention will now be described by reference to the accompanying drawings, in which:

FIG. 1B is a diagram illustrating the cross sectional profile of the tunnel of FIG. 1A;

FIG. 1C is a diagram illustrating an alternative tunnel cross section;

DETAILED DESCRIPTION

Figure 1A:
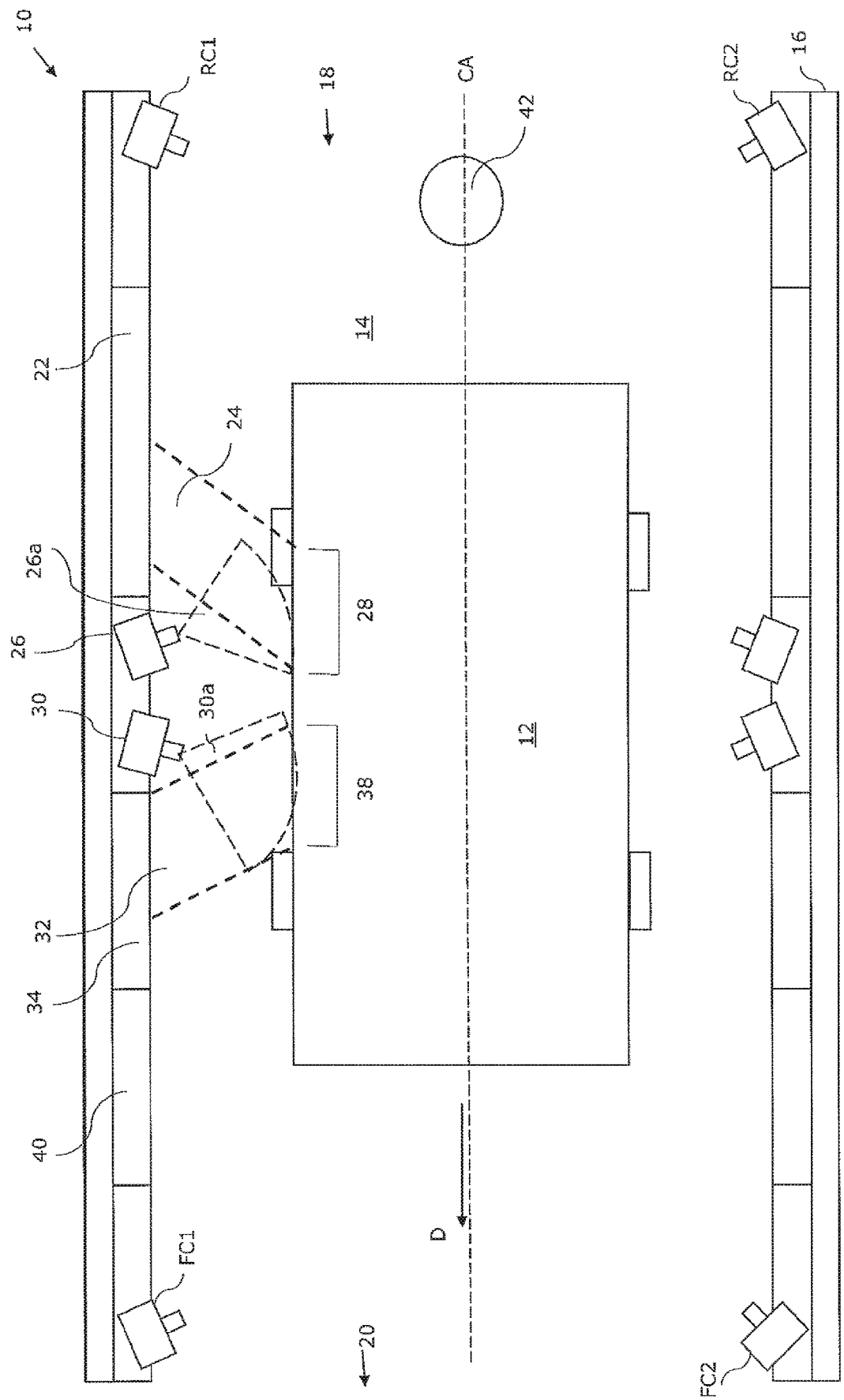
FIG. 1A is a diagram illustrating a vehicle imaging station according to an embodiment of the invention.

Referring to FIGS. 1A and 1B, a vehicle imaging station according to an embodiment of the invention is shown generally at 10. The vehicle imaging station 10 is arranged to take images of a vehicle 12 that can be used to identify damage in the form of scratches on outer panels or other surfaces of the vehicle.

The vehicle imaging station 10 is arranged around a vehicle pathway 14, which can be any path suitable for the vehicle 12 to travel along in a direction D. The pathway 14 is a straight, linear pathway in the illustrated embodiment, but in other embodiments can take any form.

The vehicle imaging station 10 comprises a tunnel 16 arranged so that the vehicle pathway 14 runs through it. In this embodiment the tunnel has two generally planar side wall sections 16a, 16b that are joined at the top by an orthogonally extending, generally planar roof 16c to form a single structure. However, in other embodiments the tunnel can have any suitable cross sectional shape, such as the arch shown in FIG. 1C to which reference should additionally be made.

The tunnel has an entrance 18 and an exit 20 via which the vehicle can enter and exit the tunnel. In this embodiment the entrance and exit are situated at opposite ends of the tunnel to define a linear vehicle pathway having a central axis CA. However, in other embodiments the tunnel can have any suitable shape and can have any number of entrances and/or exits, in some cases just a single opening that serves as both an entrance and an exit.

The inventor has recognized that it can be difficult to register scratches in images of a vehicle that have been captured by known vehicle imaging stations. The inventor has devised an improved arrangement that can detect scratches on a vehicle in a more accurate manner in comparison to known vehicle imaging stations.

The imaging station 10 includes a relatively bright reflection surface 22 and a relatively dark reflection surface 34. The term reflection surface can mean a surface that can be seen by at least one camera of a camera array when reflected via a vehicle 12 moving along the vehicle pathway. Brightness can be in terms of color and/or an illumination.

In the illustrated embodiment the relatively bright reflection surface 22 is a white colored panel and the relatively dark reflection surface 34 is a grey colored panel. Both reflection surfaces 22, 34 are plain, non-reflective, non-illuminating surfaces such as a non-patterned, matte surface. Thus, the white panel 22 is brighter than the grey panel 34.

In other embodiments one or both of the reflection surfaces 22, 34 can be illuminating surfaces such as light boxes. Where both are illuminating surfaces, one is brighter than the other in terms of illumination.

In the illustrated embodiment the camera array has first and second cameras 26, 30, but in other embodiments the camera array can comprise any number of cameras arranged to detect damage to the vehicle 12.

The first camera 26 has a first field of view 26a including a first portion 28 of the tunnel volume in which a relatively bright image defined by the relatively bright reflection surface 22 will be reflected to be visible to the camera 26 by the vehicle 12 as it moves along the vehicle pathway 14.

The second camera 30 has a second field of view 30a including a second portion 38 of the tunnel volume in which a relatively dark image defined by the relatively dark reflection surface 36 will be reflected to be visible to the camera 30 by the vehicle 12 as it moves along the vehicle pathway 14.

Together, the relatively dark image and the relatively bright image can enable scratches on the vehicle 12 to be more accurately imaged.

Multiple sets of cameras 26, 30 can be arranged inside the tunnel 16, located on the side walls 16a, 16b and roof 16c to form an arch, as shown in FIGS. 1B and 1C, so that the sides and roof of the vehicle 12 can be simultaneously imaged.

The cameras 26, 30 can be arranged by such that each can only see an exclusive one of the reflection surfaces 22, 34.

In use, the vehicle 12 enters the tunnel 16 via the entrance 18 and enters the first portion 28 of the tunnel volume. A relatively bright image defined by the relatively bright reflection surface 22 will be reflected to be visible to the camera 26. The same portion of the vehicle 12 subsequently enters the second portion 38 of the tunnel volume. A relatively dark image defined by the relatively dark reflection surface 36 will be reflected to be visible to the camera 30. The reflections paths are illustrated at 24 and 32.

Figure 2:
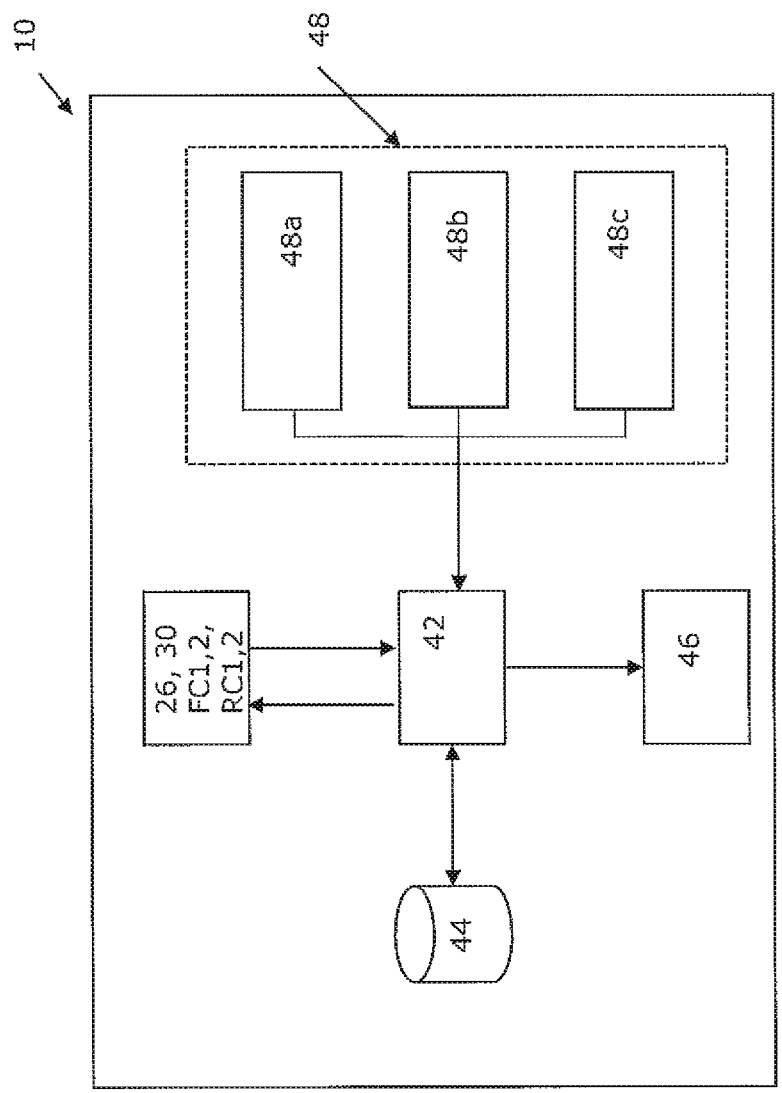
FIG. 2 is a system diagram of the controller of the imaging station of FIG. 1A.

Referring additionally to FIG. 2, the imaging station 10 can also be provided with a data processor or controller 42 such as a general purpose computer, application specific integrated circuit or the like, arranged to receive inputs from the cameras and store them in computer memory 44 and/or transmit them to a remote device 46.

The controller 42 can execute a program arranged to trigger the cameras 26, 30. The controller 42 can be arranged to trigger some or all of cameras 26, 30, FC1, FC2, RC1, RC2 in response to criteria such as input from one or more sensors 48 and/or temporal conditions having been met.

The imaging station can also be provided with one or more sensors 48 coupled to the controller. The imaging station 10 can for example comprise: a sound transducer 48a such as a microphone arranged to detect engine noise; a proximity sensor 48b arranged to detect a vehicle approaching the opening; and/or a vehicle speed sensor 48c that the controller 42 can use to synchronize cameras for stitching images together to form a continuous image of some or all of the vehicle or for adjusting camera settings such as shutter speed.

The controller 42 can execute a program to perform color matching to adjust camera settings for vehicle color. Color matching can comprise sampling the vehicle color either in the tunnel or outside via a camera. The image is then processed to determine the color of the vehicle. Depending on the color of the vehicle, all of the cameras inside the tunnel can be optimized in terms of color contrast and brightness for imaging a vehicle of the color. For example, if a white vehicle is being imaged by the system, a relatively large amount of light is reflected; however, for a black vehicle, a relatively small amount of structured light is reflected meaning that the images appears to be darker. The imaging station can therefore adjust the camera settings to allow for such variations in color.

An optional general light source 40 can be provided, such as a light box, in order to provide a general light source for the tunnel 16. Increasing the amount of light within the tunnel 16 is advantageous as it can reduce noise on the cameras, meaning that the cameras faster can be fired at a faster rate. A plurality of general light sources can be provided within the tunnel to illuminate various sides of the vehicle. However, any general light sources may not be directly visible to the cameras 26, 30 when a vehicle is being imaged.

Rear cameras RC1, RC2 can be provided at the entrance 18 of the tunnel and front cameras FC1, FC2 can be provided at the exit 20 of the tunnel 16 such that these cameras can capture images of the vehicle 12 as it enters and exits the tunnel volume.

Figure 3:
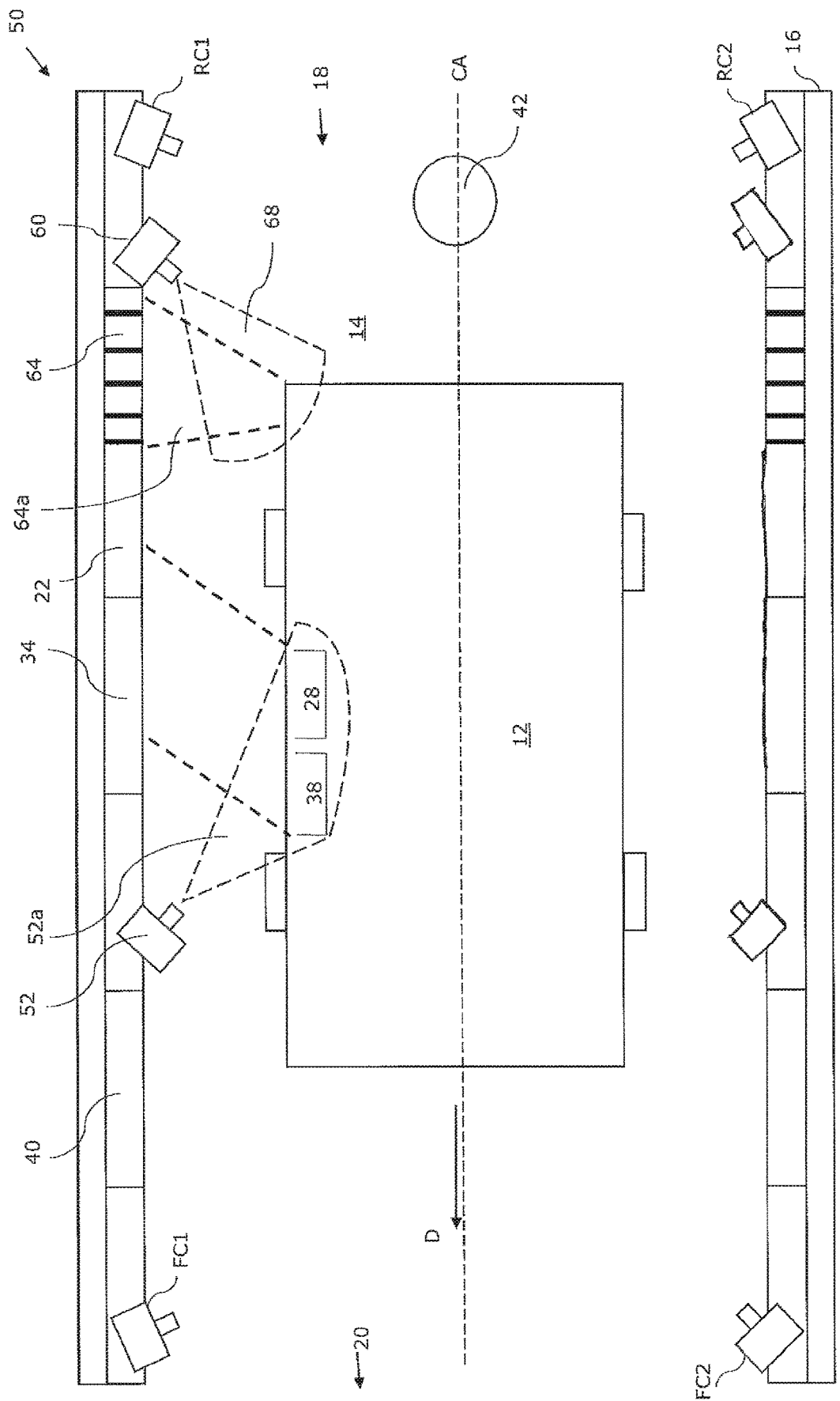
FIG. 3 is a diagram illustrating a vehicle imaging station according to a further embodiment of the invention.

FIG. 3 shows a vehicle imaging station 50 according to a further embodiment of the present invention. The vehicle imaging station 50 according to this embodiment is similar to the vehicle imaging station 10 according to the first embodiment and as such, for brevity, the following description will focus on the differences between them. Corresponding parts have been given the same reference numerals.

In this embodiment the camera array consists of a single camera 52 having an overall field of view 52a which includes a field of view which sees the relatively bright panel 22 and a second field of view which sees the relatively dark panel 34 in reflection via the vehicle 12. The controller is configured to stitch the respective field of view regions of the single camera together between images to form a continuous image of some or all of the vehicle.

The imaging station 50 also includes a dent detection camera 60 arranged to view a reflection of the structured light source 64 on the vehicle 12.

The structured light source 64 can be arranged to direct structured light 64a towards the vehicle pathway 14 for illuminating the vehicle 12 on the pathway 14 with a structured light image (not shown). In this embodiment the structured light source 64 extends up one side wall 16a from the vehicle pathway 14, across the roof section 16c and down the opposite side wall 16b, back to the vehicle pathway 14 to form an arch of structured lighting. This arrangement enables the structured light image to be projected onto both sides, and the roof, of the vehicle 12 as it passes the structured light source 64. The structured light source 64 is a light array having a set of LED strips arranged in parallel. The LED strips extend along each light array, from the bottom to the top and across the roof section. LEDs can for example be ultrabright cool white LED tape, with a luminosity of 2880 lumens per meter. In one example a set of twenty LED strips can be arranged into 14.2 mm wide grooves spaced 16 mm apart and set 9 mm deep with a 10 mm backing behind them. Semi opaque frosted diffusers (not shown) can be provided over each strip of LEDs to create a flat light from each strip of tape.

In other embodiment the structured light source 64 can have any suitable configuration arranged to project the structured light image onto one or more surfaces and in some cases all outer surfaces of the vehicle; for example, each light source can include a laser projector configured to project one or more light patterns.

Multiple dent cameras 60 can be arranged inside the tunnel 16, located on the side walls 16a, 16b and roof 16c to form an arch, as shown in FIG. 1B, so that the sides and roof of the vehicle 12 can be simultaneously imaged.

Each dent detecting camera 60 can be arranged with a field of view 68 comprising a structured light portion 64a of the tunnel volume in which the structured light image will be reflected to be visible to the dent detecting camera 60 by a vehicle 12 moving along the vehicle pathway 14. Thus, the dent detecting cameras 60 are located in the tunnel 16 so that the dent camera field of view 68 overlaps with the striped pattern reflecting on the vehicle 64a. The system can be calibrated for an average or expected vehicle profile for example.

Should the vehicle 12 have a dent in the bodywork, the striped reflections will distort around the dent, for example creating a circle like shape in the reflection. The images captured by the dent detection cameras 60 can then be used retrospectively to analyze whether a vehicle 12 has dents at a certain point in time. Thus, the field of view of the dent detecting cameras 68 overlap the reflected striped image area 64a on the vehicle 12.

In other embodiments the functionality of the dent detection camera 60 can be provided by the single camera 52 i.e. it can include a field of view arranged to see the structured light source 64 in reflection via the vehicle 12. In such embodiments, a single scratch detecting field of view can be provided, although this can adversely impact the ability to detect scratches on the vehicle 12.

In other embodiments a dent detection camera 60 arranged to view the reflection of a structured light source 64 on the vehicle 12 can be incorporated in a station 10 as described with reference to FIG. 1.

In any embodiment the ends of the side wall(s) can define the opening and exit i.e. the opening and exit can have roughly the same cross sectional area as other portions of the tunnel. Alternatively, the ends of the side wall(s) can extend inwardly towards one another to define angled end wall portions which define the entrance and exit. This arrangement can enable the middle portion of the tunnel to have a relatively large cross sectional area for containing equipment, while the area of the entrance and exit is each relatively small to control the amount of light that can enter the tunnel. Where angled end wall portions are provided, a structured light source can be mounted on or adjacent the internal surface(s) of the angled end wall portions. This can reduce the likelihood of a driver of the vehicle seeing the structured light image as the vehicle enters the tunnel.

In any embodiment the cameras can comprise scan cameras such as one or more Hikvision® MV-CA050-10GC area scan cameras.

In any embodiment the cameras can be fixed to tunnel and thus the cameras will take the shape of the inside of the tunnel. Alternatively, the cameras can be mounted on dedicated mounting structures.

The vehicle imaging station can comprise a unique identifier capture system (not shown) for capturing and processing one or more images of unique identifiers associated with vehicle being imaged by the apparatus. The system can for example be arranged to capture the vehicle number plate or chassis number as the vehicle passes through the tunnel.

Although the invention has been described above with reference to one or more embodiments, it will be appreciated that various changes or modifications can be made without departing from the scope of the invention as defined in the appended claims. Embodiments of the invention extend to an arrangement having fewer than four scratch detecting cameras, for example a single forward and rear facing camera, and the patterned portion does not need to be between the non-patterned portions. The word "comprising" can mean "including" and therefore does not exclude the presence of elements or steps other than those listed in any claim or the specification as a whole. The mere fact that certain measures are recited in mutually different dependent claims does not indicate that a combination of these measures cannot be used to advantage.

What is claimed is:

1. A vehicle imaging station for capturing images of scratches on a vehicle, the vehicle imaging station comprising:
    a tunnel having an entrance and an exit with one or more walls defining an enclosure between the entrance and exit to define a tunnel volume containing a vehicle pathway having a central axis;
    a first relatively bright reflection surface;
    a relatively dark reflection surface; and
    a camera array comprising one or more cameras arranged with:
        a first field of view comprising a first portion of the tunnel volume in which a relatively bright image defined by the first relatively bright reflection surface will be reflected to be visible to the camera array by a vehicle moving along the vehicle pathway; and a second field of view comprising a second portion of the tunnel volume in which a relatively dark image defined by the relatively dark reflection surface will be reflected to be visible to the camera array by a vehicle moving along the vehicle pathway, wherein at least one of the relatively dark reflection surface or the first relatively bright reflection surface comprises a non-reflective, non-illuminating and non-patterned surface.

2. The vehicle imaging station according to claim 1, further comprising a second relatively bright reflection surface, the second relatively bright reflection surface being relatively bright in comparison to the relatively dark reflection surface, the camera array comprising a third field of view comprising a third portion of the tunnel volume in which a second relatively bright image defined by the second relatively bright reflection surface will be reflected to be visible to the camera array by a vehicle moving along the vehicle pathway.

3. The vehicle imaging station according to claim 2, wherein the second relatively bright reflection surface is relatively bright in comparison to the first relatively bright reflection surface.

4. The vehicle imaging station according to claim 2, wherein at least one of the relatively dark reflection surface, the first relatively bright reflection surface or the second relatively bright reflection surface comprises an illuminated surface.

5. The vehicle imaging station according to claim 2, wherein the second relatively bright reflection surface comprises a structured light source.

6. The vehicle imaging station according to claim 1, wherein the camera array comprises a single camera, the field of view of the single camera comprising the first and second fields of view.

7. The vehicle imaging station according to claim 1, wherein each field of view can be defined by a distinct camera of the camera array.

8. The vehicle imaging station according to claim 1, wherein the first and second fields of view define a first vision region pair, arranged together to enable scratch detection of a region of a vehicle and the imaging station comprises one or more further vision region pairs, at least one of which is mounted on the opposite side of the central axis of the vehicle pathway in comparison to the first pair and/or one of which can be mounted on a roof surface of the tunnel facing the vehicle pathway in order to capture images of the roof.

9. The vehicle imaging station according to claim 1, wherein the imaging station comprises a controller arranged to receive images from the cameras and at least one of store them in computer memory or transmit them to a remote device.

10. The vehicle imaging station according to claim 9, wherein the controller is arranged to execute a program arranged to trigger the cameras in response to criteria comprising input from one or more sensors and/or temporal conditions having been met.

11. The vehicle imaging station according to claim 9, comprising one or more sensors coupled to the controller.

12. The vehicle imaging station according to claim 11, wherein the sensors comprise at least one of: a sound transducer such as a microphone arranged to detect engine noise; a proximity sensor arranged to detect a vehicle approaching the opening; or a vehicle speed sensor that the controller can use to synchronize cameras for stitching images together to form a continuous image of some or all of the vehicle or for adjusting camera settings such as shutter speed.

13. The vehicle imaging station according to claim 9, wherein the controller is arranged to execute a program to perform color matching to adjust camera settings for vehicle color.

14. The vehicle imaging station according to claim 1, wherein the camera array is a scratch detection camera array and wherein the vehicle imaging station further comprises:

a structured light source arranged to direct structured light towards the vehicle pathway for illuminating a vehicle on the pathway with a structured light image; and a dent detecting camera distinct from the scratch detection camera array and arranged with a field of view comprising a structured light portion of the tunnel volume in which the structured light image will be reflected to be visible to the dent detecting camera by a vehicle moving along the vehicle pathway, wherein the first relatively bright reflection surface and the relatively dark reflection surface are distinct from the structured light source.

15. The vehicle imaging station according to claim 1, wherein the first relatively bright reflection surface and the relatively dark reflection surface each extends around the tunnel.

16. A vehicle imaging station for capturing images of scratches on a vehicle, the vehicle imaging station comprising:

a tunnel having an entrance and an exit with one or more walls defining an enclosure between the entrance and exit to define a tunnel volume containing a vehicle pathway having a central axis;

a relatively bright surface;

a relatively dark surface; and a scratch detection camera array comprising one or more cameras arranged with:

a first field of view comprising a first portion of the tunnel volume in which a relatively bright image defined by the relatively bright surface will be reflected to be visible to the camera array by a vehicle moving along the vehicle pathway;

a second field of view comprising a second portion of the tunnel volume in which a relatively dark image defined by the relatively dark surface will be reflected to be visible to the camera array by a vehicle moving along the vehicle pathway, wherein the relatively bright surface and the relatively dark surface are arranged such that a scratch is more visible in one than the other and the relatively bright surface and relatively dark surface each extends around the tunnel, and wherein the relatively bright surface comprises a light box and the relatively dark surface comprises a non-reflective, non-illuminating surface, wherein the vehicle imaging station further comprises:

a structured light source arranged to direct structured light towards the vehicle pathway for illuminating a vehicle on the pathway with a structured light image; and a dent detecting camera distinct from the scratch detection camera array and arranged with a field of view comprising a structured light portion of the tunnel volume in which the structured light image will be reflected to be visible to the dent detecting camera by a vehicle moving along the vehicle pathway, wherein the relatively bright surface and the relatively dark surface are distinct from the structured light source.

* * * * *